Dec. 1, 1953 E. W. WASIELEWSKI 2,660,991
SUPERCHARGER DRIVING CONTROL
Filed Aug. 22, 1949
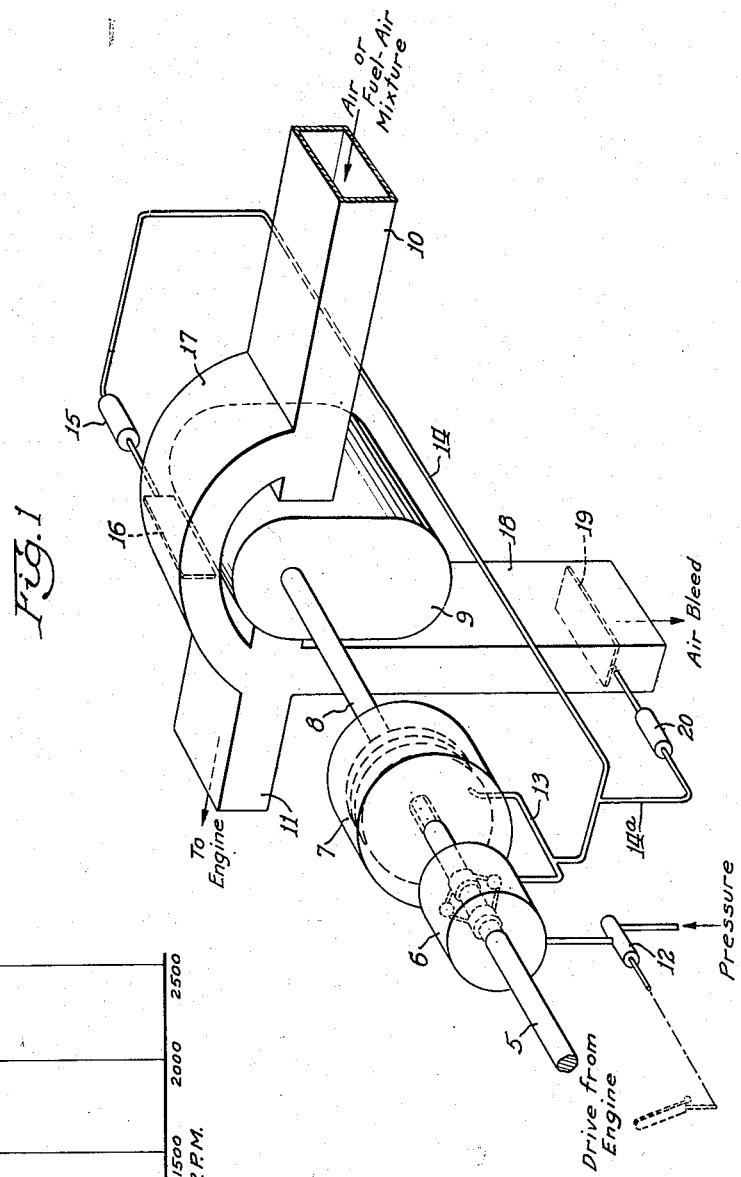
Inventor:
Eugene W. Wasielewski Patented Dec. 1, 1953

2,660,991

UNITED STATES PATENT OFFICE 2,660,991

SUPERCHARGER DRIVING CONTROL

Eugene W. Wasielewski, South Euclid, Ohio, assignor to Borg-Warner Corporation, Chicago, Ill., a corporation of Illinois Application August 22, 1949, Serial No. 111,695

12 Claims. (Cl. 123—119)

This invention relates to superchargers, and more particularly to a drive control mechanism for a supercharger enabling use of the supercharger to overcome the low speed, low torque characteristic of an internal combustion type engine, while automatically disabling the supercharger at higher speeds to avoid overloading the engine.

A common difficulty with internal combustion type engines, particularly for automotive use, has been the low available engine torque at low engine operating speeds. At low speeds, the engine normally develops a very small fraction of the power of which it is capable at higher engine speeds. It is for this reason as much as any other that it is the usual practice to provide a very low ratio first speed gear when such engines are employed in automobiles or other devices where the starting inertia normally is relatively high. On the other hand, as the rotational speed of an internal combustion type engine increases, the torque, that is, the power developed by the engine, also increases so that at the higher engine speeds the maximum torque for which the engine is designed is developed. At a definite point substantially less than the maximum engine speed, maximum torque is developed and thereafter higher rotational speeds generally produce no higher torque. When a supercharger is associated with such an engine in accordance with conventional practice, the effect is to markedly increase the initial available torque. With such an arrangement, so long as the engine is operated at moderate speeds, that is, at speeds producing less than the maximum torque for which the engine is designed, no difficulty is encountered. However, with a supercharger, the torque continues to increase as the rotational speed of the engine increases through the operating range of the engine, and it has been found that at the higher engine speeds very often the torque developed using a supercharger exceeds substantially the torque for which the engine is stressed. Thus, in order to apply superchargers widely in the automotive field, it becomes necessary either to redesign the engine with which the supercharger is to be associated so that it will be capable of withstanding the extremely high torque available at high speeds, or to provide some means for disabling the supercharger once maximum desired torque is reached.

It is an object of this invention to provide a new and improved supercharger system for automotive use.

It is a further object of this invention to provide a supercharger drive control arrangement whereby the supercharger is made operative over a limited range of engine speed, and at a predetermined, relatively high engine speed, the supercharger is disabled.

In accordance with one embodiment of this invention, a supercharger may be drivingly connected to an engine through a hydraulically actuated clutch so arranged that the clutch is not engaged until a certain minimum throttle opening is obtained. A by-pass is provided for the supercharger output controlled by a hydraulically actuated valve operated by a governor arranged so that upon actuation of the clutch, the by-pass valve is closed, but upon a predetermined engine speed being attained, the valve is opened to by-pass the output of the supercharger, and the governor is thereafter effective to disengage the clutch, thus disabling the supercharger.

Other objects and advantages of the present invention will be apparent from the following detailed description taken in conjunction with the drawings wherein:

Fig. 1 is a schematic view of a supercharger drive control arrangement constructed in accordance with one embodiment of this invention; and Fig. 2 is a graph explanatory of the operation of an internal combustion type engine, curve A illustratnig the operation without a supercharger, curve B illustrating the operation with a conventional supercharger arrangement, and curve C illustrating the operation with the supercharger drive control arrangement of this invention.

Referring first to Fig. 2, curve A illustrates engine torque plotted against engine R. P. M. It will be noted from curve A that below approximately 500 R. P. M. a relatively small amount of torque is available from the engine and that maximum torque is not reached until approximately 1500 R. P. M. It will be apparent, therefore, the portion of the curve to which improvement of torque is most applicable is that lying between approximately zero and 1,000 R. P. M. By employing a supercharger with the engine and, particularly, by employing a gear driven supercharger of the positive displacement type wherein the output of the supercharger is directly proportional to engine speed, a torque curve similar to that shown in curve B is obtained. However, while this arrangement, as is readily evident from curve B, provides more torque in the low speed range, it also provides considerably more torque in the high speed range. Since with modern automotive type engines increased torque in the high speed range is not generally necessary and, because of the problems of stress and bearing loads may, in fact, be highly undesirable, elimination of the increased torque in the high speed range would provide improved operation, provided that the increased torque in the low speed range could be maintained. Curve C illustrates the torque speed characteristic obtainable with the present invention, and it will be noted that a substantially higher torque is obtained in the lower speed range than that available either without the supercharger or with the conventional supercharger. The reason for the difference between the torque speed characteristic with the conventional supercharger and the supercharger arrangement of the present invention is that the arrangement of the present invention enables the use of a supercharger of greater capacity than feasible with the conventional arrangement.

Referring now to the drawings and particularly to Fig. 1 thereof, a supercharger drive control arrangement is there illustrated wherein a shaft 5 is shown fragmentarily and is connected to a centrifugal governor 6 to drive the same. Shaft 5 may be connected directly to the engine with which the supercharger is to be associated or may be connected through a belt and pulley arrangement. Shaft 5 extends axially through the governor 6 and is connected at its right end to one element of a clutch designated at 7, the engagement of the clutch 7 being controlled by the centrifugal governor 6. Clutch 7 in turn has its other element drivingly connected to a shaft 8 arranged to drive a supercharger designated generally at 9. The supercharger 9 may be either the positive displacement type sometimes referred to as a Root's blower, or a centrifugal supercharger. Air, or a mixture of fuel and air, depending on whether the supercharger is located ahead of the carbureter or between the carbureter and the engine manifold, or is used in conjunction with a diesel engine and thus without a carbureter, is admitted to the supercharger 9 through an inlet duct 10 positioned on the right side thereof, as shown in Fig. 1 and air under pressure, or the fuel and air mixture, as the case may be, is delivered from the supercharger through an outlet duct 11 mounted on the left side thereof, as viewed in Fig. 1.

A control valve 12 is connected between the centrifugal governor 6 and a source of pressure (not shown) and the control valve 12 is so arranged that the valve is closed at low engine operating speeds, for example, idling speed. Thus, the control valve 12 may be well associated with the throttle of the engine and connected so that at the idling throttle position the valve is closed but opens in response to the throttle being opened beyond a certain point. Such a connection involves no more than a simple mechanical linkage as will be readily apparent to those skilled in the art. At a predetermined throttle opening above idling position, the control valve 12 is opened, admitting pressure to the centrifugal governor 6, and such pressure is applied directly therefrom to the clutch 7 through pressure line 13, causing the clutch 7 to be engaged. When clutch 7 is engaged, shaft 5 rotates shaft 8 and thereby causes operation of the supercharger 9. At the same time, pressure is applied through a pressure line 14 connected at one end to the line 13 and at its other end to a control mechanism 15 associated with a normally open by-pass valve 16 positioned in a by-pass duct 17. By-pass duct 17, unless closed by the valve 16, provides a passage from the outlet duct 11 of the supercharger to the inlet side thereof, as will be readily apparent from Fig. 1. However, application of pressure to the control mechanism 15 causes the valve 16 to close the by-pass duct. Accordingly, with the valve position illustrated, air, or fuel and air, are supplied by the supercharger to the engine under pressure.

Centrifugal governor 6 responds, of course, to engine speed being driven by engine driven shaft 5 and has associated therewith suitable valving mechanism whereby at a predetermined rotational speed the valving mechanism will begin to shut off the pressure admitted to the system from the valve 12. Thus, as the speed of the engine increases and the torque approaches the maximum desired value, centrifugal governor 6, by reducing the pressure on control mechanism 15, serves to gradually open the valve 16, thereby gradually decreasing the pressure supplied to the engine from the supercharger and making it possible for the torque curve to blend into the unsupercharged torque curve. At a predetermined engine speed, the governor valving mechanism will be entirely closed, the pressure previously applied to by-pass valve control mechanism 15 will be shut off and the valve 16 will be opened wide by the governor. At the same time, the governor simultaneously disengages the clutch by removing pressure therefrom, and the engine operates beyond this speed as an unsupercharged engine. It will be understood that the characteristic of curve C can be regulated in the low speed range by modifying the supercharger design to provide the desired characteristic.

The arrangement so far described is particularly suitable for use where the supercharger is connected between the carbureter and the manifold, the by-pass duct 17 permitting recirculation of a fuel and air mixture and, thus, preventing loss of fuel. In some cases, it may be desirable, because of the heat developed by the supercharger itself, to prevent recirculation of the warm air despite loss of fuel. Also, where the supercharger is connected ahead of the carbureter, that is, the carbureter is used as a blown carbureter, the need for recirculating fuel to prevent loss thereof is obviated. Under these latter conditions, it is possible to employ an air bleed or dumping duct 18 connected to the outlet duct 11 of the supercharger and having positioned therein a normally open valve 19 similar to the valve 16. A valve control mechanism 20 associated with valve 19 would be connected to the line 13 by a line 14a substituted for the line 14, or where a supercharger control arrangement is to be supplied capable of operating either with a blown carbureter or between the carbureter and the manifold, a suitable valve (not shown) might be employed to disconnect the line 14 and connect the line 14a. With such an arrangement, it would, of course, be necessary to provide some means for locking the control valve 16 in closed position, or conversely, where the by-pass is to be used, for locking the dumping valve 19 in closed position. While in Fig. 1 both the bypass arrangement and the dumping arrangement have been illustrated, it will be understood that for most applications the supercharger would be constructed with either one or the other of these arrangements and not both.

The operation of the air bleed valve 19 is essentially the same as that of the by-pass valve 16 and when the centrifugal governor closes the pressure path from the pressure source, the valve 19 would open. Both valve control mechanisms 15 and 20 or the associated valves 16 and 19 are preferably spring biased so that in the absence of actuating pressure on the control, the valves will stay open. Thus, when the clutch 7 is disengaged and the supercharger not running, air or fuel and air is admitted through either the normally open duct 18 or through the normally open by-pass duct 17.

From the foregoing, it will be apparent that in the initial or idling stage of operation of the engine with which this supercharger arrangement is to be connected, the supercharger is inoperative. Then, as the throttle opening is increased by advancing the throttle beyond a predetermined position, pressure control valve 12 is opened to admit pressure to the governor 6, causing engagement of clutch 7 and consequent operation of the supercharger 9. At the same time the pressure supplied to valve mechanism 15 or 20 closes the associated valve to prevent diversion of the supercharger ouput. The supercharger is then operated at maximum effectiveness over the range of engine speeds up to, for example, 500 R. P. M. after which the pressure applied to the valve actuating mechanism from the centrifugal governor is gradually reduced, permitting the associated valve to begin to open. This speed level, of course, may be changed, as required, for any particular case. At a predetermined engine operating speed representing maximum desired torque value, the governor 6 completely shuts off the pressure supply to the valve control mechanism, permitting the associated valve to open and thereby to divert the supercharger output. At the same time, the clutch 7 is disengaged, thus reducing the engine load and increasing the power available for driving the vehicle, for example.

By employing this invention, it is thus feasible to use a high capacity supercharger to obtain maximum possible engine torque at low speeds without danger of damaging the engine by increasing the torque undesirably at high speeds. At the same time the supercharger is protected from excessive speeds by this system and can, therefore, be designed to cover the desired range without making any provisions for overspeeding.

While the means for controlling the by-pass valve 16 and dumping valve 19 have been described as hydraulic, it will be evident that suitable mechanical linkage and speed responsive control mechanism could be substituted therefor where liquid pressure is not readily available, or pneumatic or electrical mechanisms employed without departing from the scope of the present invention.

Where herein the various parts of this invention have been referred to as being located in a right or a left position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. A supercharger for an internal combustion type engine including clutch means for drivingly connecting the supercharger to the engine, governor means associated with said supercharger and responsive to engine speed, and diverting means associated with said supercharger and adapted for being opened by said governor means at a predetermined engine operating speed at which said engine develops maximum torque regardless of further increases in engine speed to divert the output of said supercharger from said engine.

2. A supercharger for an internal combustion type engine including clutch means for drivingly connecting the supercharger to the engine, a governor adapted for being driven by said engine, speed responsive control means associated with said governor, and by-pass means associated with said supercharger and rendered effective by said control means at a predetermined engine operating speed to by-pass the output of said supercharger, said control means being effective to disengage said clutch at said predetermined engine operating speed.

3. A supercharger for an internal combustion type engine including clutch means for drivingly connecting the supercharger to the engine, a governor responsive to engine speed to disengage said clutch at a predetermined engine operating speed, by-pass means associated with said supercharger and rendered effective by said governor at a predetermined engine operating speed to by-pass the output of said supercharger, and means for rendering said governor inoperative.

4. A supercharger for an internal combustion type engine including clutch means for drivingly connecting the supercharger to the engine, a governor responsive to engine speed, and means associated with said supercharger and rendered effective by said governor at a predetermined engine operating speed at which said engine develops maximum torque regardless of further increases in engine speed for diverting the output of said supercharger from said engine.

5. A supercharger for an internal combustion type engine including clutch means for drivingly connecting the supercharger to the engine, a governor means responsive to engine speed, and means associated with said supercharger and rendered effective by said governor at a predetermined engine operating speed for dumping the output of said supercharger, said governor being effective to disengage said clutch at said predetermined engine operating speed.

6. In a drive control mechanism for a supercharger adapted to be associated with an internal combustion type engine, a shaft adapted to be driven by said engine, a centrifugal governor rotatable with said shaft, means for supplying hydraulic pressure to said governor, normally open valving mechanism associated with said governor and arranged to close in response to said governor rotating at a predetermined speed, a plural element clutch having one element thereof connected to be rotated by said shaft, said clutch elements being arranged to engage in response to fluid pressure applied thereto through said governor, an output shaft associated with the other element of said clutch and drivingly connected to the supercharger, a by-pass valve connected in the output side of said supercharger, and actuating mechanism associated with said by-pass valve and connected through said governor valving mechanism to said pressure supplying means, said actuating mechanism being operable in response to pressure being applied thereto to hold said valve in closed position.

7. A supercharger for an internal combustion type engine including means for drivingly connecting the supercharger to the engine and means responsive to engine speed and independent of the load on the engine for disabling said supercharger at and above a predetermined engine operating speed at which said engine develops maximum torque regardless of further increases in engine speed.

8. A supercharger for an internal combustion type engine including means for drivingly connecting the supercharger to the engine, diverting means associated with said supercharger, and speed responsive means for rendering said diverting means effective at a predetermined engine operating speed to divert the output of the supercharger from said engine, said speed responsive means being operatively associated with said connecting means for disabling the connecting means at said predetermined engine operating speed.

9. A supercharger for an internal combustion type engine including means for drivingly connecting the supercharger to the engine, means associated with said supercharger for diverting a substantial part of the output thereof from said engine, and speed responsive means for rendering said diverting means effective at a predetermined engine operating speed at which speed the engine torque has reached a predetermined maximum desired value regardless of further increases in engine speed.

10. A supercharger for an internal combustion type engine including means for drivingly connecting the supercharger to the engine, means for interrupting said supercharger driving connection at selected engine operating speeds, and means responsive to engine speed for diverting a substantial part of the output of said supercharger from said engine at a predetermined engine operating speed at which speed the engine torque has reached a predetermined maximum desired value regardless of further increases in engine speed.

11. A supercharger for an internal combustion-type engine including means for drivingly connecting the supercharger to the engine, passage defining means for connecting the discharge side of the supercharger to the engine for supercharging the engine, means associated with said supercharger and connected to said passage defining means for diverting a substantial part of the output of said supercharger from said engine, and speed responsive means for rendering said diverting means effective at a predetermined, relatively high engine operating speed at which said engine develops maximum torque regardless of further increases in engine speed.

12. In combination, an internal combustion-type engine, a supercharger, passage defining means connecting the discharge side of said supercharger with said engine, a drive shaft for said supercharger, a clutch connected to said drive shaft, a shaft driven by said engine and connectible through said clutch in driving relation with said supercharger drive shaft, speed responsive governor means driven by said engine driven shaft for controlling the engagement and disengagement of said clutch, means for controlling the operation of said governor means, and means associated with said passage defining means and controlled by said governor for diverting a substantial part of the output of said supercharger from said engine at one or more predetermined engine operating speeds, said last defined means being operated independently of the load on said engine.

EUGENE W. WASIELEWSKI.

References Cited in the file of this patent

UNITED STATES PATENTS

| Number | Name | Date |
|---|---|---|
| 1,031,245 | Chapin | July 2, 1912 |
| 1,073,801 | Friedrichs | Sept. 23, 1913 |
| 1,396,976 | Spelts, Jr. | Nov. 15, 1921 |
| 1,468,987 | Abbott | Sept. 25, 1923 |
| 1,955,799 | Fielden | Apr. 24, 1934 |
| 2,067,757 | Fielden | Jan. 12, 1937 |
| 2,404,323 | Staley | July 16, 1946 |
| 2,484,672 | Beall | Oct. 11, 1949 |